United States Patent
Alsadah

(10) Patent No.: US 12,268,982 B2
(45) Date of Patent: Apr. 8, 2025

(54) SYSTEM AND METHOD OF PRODUCING COOLED DRY GAS

(71) Applicant: KING FAHD UNIVERSITY OF PETROLEUM AND MINERALS, Dhahran (SA)

(72) Inventor: Jihad Hassan Alsadah, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 468 days.

(21) Appl. No.: 17/862,792

(22) Filed: Jul. 12, 2022

(65) Prior Publication Data

US 2023/0134370 A1 May 4, 2023

Related U.S. Application Data

(60) Provisional application No. 63/273,375, filed on Oct. 29, 2021.

(51) Int. Cl.
*B01D 53/02* (2006.01)
*B01D 11/00* (2006.01)
*B01D 47/02* (2006.01)
*B01D 53/26* (2006.01)
*B01D 53/62* (2006.01)

(52) U.S. Cl.
CPC ............. *B01D 53/02* (2013.01); *B01D 11/00* (2013.01); *B01D 47/021* (2013.01); *B01D 53/261* (2013.01); *B01D 53/265* (2013.01); *B01D 53/62* (2013.01); *B01D 2257/504* (2013.01); *B01D 2257/80* (2013.01)

(58) Field of Classification Search
None
See application file for complete search history.

(56) References Cited

U.S. PATENT DOCUMENTS

| | | |
|---|---|---|
| 3,119,771 A | 1/1964 | Cottle |
| 3,344,616 A | 10/1967 | Owne |
| 6,475,460 B1 | 11/2002 | Max |

(Continued)

FOREIGN PATENT DOCUMENTS

DE 3827806 A1 * 2/1990 ........... B01D 53/261

OTHER PUBLICATIONS

English language machine translation for DE 3827806 A1. Retrieved from translationportal.epo.org on Dec. 17, 2024. (Year: 2024).*

(Continued)

*Primary Examiner* — Jason M Greene
(74) *Attorney, Agent, or Firm* — Oblon, McClelland, Maier & Neustadt, L.L.P.

(57) ABSTRACT

A method of producing a cooled dry gas is provided. The method includes exposing an input gas to an aqueous saline solution having a temperature of 20 to 80° C. to produce a first intermediate gas. In addition, the method further includes exposing the first intermediate gas to freshwater having a temperature of greater than −5° C. to less than 20° C. to produce a second intermediate gas. The method also includes cooling the second intermediate gas to a temperature of −40 to −5° C. to produce a cooled gas. The method further includes exposing the cooled gas to a chemical adsorbent to produce a saturated adsorbent and the cooled dry gas.

20 Claims, 12 Drawing Sheets

(56) References Cited

U.S. PATENT DOCUMENTS

| | | | |
|---|---|---|---|
| 2009/0071172 A1 | 3/2009 | Vanden Bussche et al. | |
| 2014/0197022 A1* | 7/2014 | Antar | C02F 1/14 |
| | | | 202/174 |
| 2017/0106333 A1* | 4/2017 | Zhu | B01D 53/1406 |

OTHER PUBLICATIONS

Cipollina, et al. ; A brine evaporative cooler/concentrator for autonomous thermal desalination units ; Desalination and Water Treatment, vol. 31, 2011 ; Aug. 3, 2012 ; Abstract Only ; 5 Pages.
Gholizadeh, et al. ; Freshwater and cooling production via integration of an ethane ejector expander ; Semantic Scholar ; Mar. 1, 2020 ; Abstract Only ; 4 Pages.

* cited by examiner

SYSTEM AND METHOD OF PRODUCING COOLED DRY GAS

CROSS-REFERENCE TO RELATED APPLICATION

The present application claims priority to U.S. Provisional Application No. 63/273,375, filed Oct. 29, 2021, the teaching of which is hereby incorporated by reference in its entirety for all purposes.

BACKGROUND

Technical Field

The present disclosure is directed to a system and method, and particularly, to a method of producing a cooled dry gas via a gas cooling system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Industrial processing of gases commonly involves steps which involve cooling hot gases and steps which involve removing moisture from humid gases. Gas cooling is typically done using heat exchange, expansion, or spray cooling (also know as evaporative cooling). Of these methods, spray cooling is advantageous for the efficient and rapid cooling provided by the large latent heat of vaporization of water. An unfortunate side-effect, however, is that the gas becomes humidified as the spray turns to water vapor. This water vapor must then be removed if a dried gas is desired. Conventionally, adsorption methods are used to dry gas streams. Adsorbents or dessicants may selectively remove water vapor, generating a humid or wet adsorbent which must either be discarded for fresh adsorbent or regenerated to restore adsorption capacity. Such regeneration may be performed by lowering the pressure or by increasing the temperature, each of which can cause water to desorb. Each of these regeneration processes, however, also subject the adsorbents beds to thermal or mechanical degradation, which shorten the useful lifetime of the adsorbents. Such factors may lead to higher processing costs. Further, energy may be required for operations of adsorption methods.

U.S. Pat. No. 6,475,460B1 relates to methods and apparatus for desalination of saline or polluted water. The saline water is pumped to a desalination installation and down to a base of a desalination fractionation column. The saline water is mixed with a hydrate-forming gas or liquid to form a positively buoyant hydrate or a negatively buoyant hydrate. The formed hydrate rises or sinks or is carried into a lower pressure area and dissociates or melts into gas and pure water.

U.S. Pat. No. 3,344,616A relates to a method of cold desalination involving forming ice in brine by cooling, separating the ice from the brine, rinsing the ice with rinsing air to remove residual salt, and heating the rinsed ice to melt and produce freshwater. The rinsing air is described as being humidified by mixing with air used in separating the ice from the brine to ensure that minimal evaporative losses during rinsing occur. A refrigerant is used to provide cooling of the brine during ice formation and heating the rinsed ice during melting.

U.S. Pat. No. 3,119,771A relates to a method of producing salt free water by iteratively forming and melting gas hydrate crystals. The iterative forming and melting is accomplished by a pulsating pressure reflux. The method involves forming, separating, and melting the gas hydrate crystals. Further, heat is supplied to the gas hydrate crystals to accomplish the melting. A gas is liberated from melted gas hydrate crystals.

US20090071172A1 relates to a process and apparatus for the desalination of water by freezing seawater. The process includes alternating a flow of a liquefied natural gas to freeze seawater in a heat exchanger and followed by flowing a hot gas through the heat exchanger to melt the frozen seawater, and further the process is repeated.

Each of the aforementioned patent references suffers from one or more drawbacks hindering their adoption. Additionally, these references focus on producing freshwater through desalination processes. These systems and methods do not produce a cooled dry gas. Accordingly, it is one object of the present disclosure to provide a system and method of producing a cooled, dry gas which overcomes the limitations mentioned above.

SUMMARY

The present disclosure relates to a method of producing a cooled dry gas, the method comprising bubbling an input gas through an aqueous saline solution having a temperature of 20 to 80 degree Celsius (° C.) to produce a first intermediate gas, bubbling the first intermediate gas through freshwater having a temperature of greater than −5° C. to less than 20° C. to produce a second intermediate gas, cooling the second intermediate gas to a temperature of −40 to −5° C. to produce a cooled gas, and passing the cooled gas through a chemical adsorbent to produce a saturated adsorbent and the cooled dry gas.

In some embodiments, the bubbling is achieved using a wash apparatus comprising a container comprising a swirling section, a gas inlet, a wash liquid which is the aqueous saline or the freshwater contained within the container, a gas diffuser disposed at or within 10 cm below a surface of the wash liquid, the gas diffuser spanning at least 50% of a width of the container and being connected to the gas inlet, gas swirlers disposed in the swirling section, the swirlers comprising continuous angled or curved plates disposed throughout an entirety of a swirling section, a demister, and a gas outlet.

In some embodiments, the gas diffuser is connected to the gas inlet via a flexible connection which permits the gas diffuser to remain disposed at or within 10 cm below a surface of the wash liquid as a volume of the wash liquid changes.

In some embodiments, the cooling the second intermediate gas produces a first purified water which is separated from the cooled gas.

In some embodiments, the method further includes before the bubbling, removing particulates from the input gas.

In some embodiments, the removing particulates is performed by at least one selected from a group including filtration, electrostatic precipitation, cyclonic separation, and wet scrubbing.

In some embodiments, the method further includes subjecting the saturated adsorbent to a regeneration process to produce a second purified water and reform the chemical adsorbent.

In some embodiments, the method further includes compressing the second intermediate gas to reform the input gas and repeating a cycle of the exposing of the input gas to the aqueous saline solution and the bubbling of the first intermediate gas. The method includes 2 to 100 such cycles before the cooling.

In some embodiments, the input gas is at least one selected from a group including an ambient atmosphere including nitrogen and oxygen, a hydrocarbon-including gas including a mixture of hydrocarbons including at least two selected from a group including methane, ethane, butane, propane, ethene, propene, 1-butene, 2-butene, and acetylene, and a fossil fuel waste gas including carbon dioxide.

In some embodiments, the input gas is an ambient atmosphere including nitrogen and oxygen and the second intermediate gas has a humidity of 3 to 5 gram (g) $H_2O$/kilogram (kg) input gas.

In some embodiments, the input gas is an ambient atmosphere including nitrogen and oxygen and the method produces 0.05 to 0.25 kg purified water per kg of ambient atmosphere cooled by the method.

The present disclosure also relates to a gas cooling system. The gas cooling system comprises an input gas stream, a compressor comprising a gas inlet and a gas outlet, the compressor configured to receive the input gas stream and provide a compressed gas stream, a saline wash apparatus comprising a saline wash gas inlet and a saline wash gas outlet, the saline wash apparatus configured to receive the compressed gas stream, bubble the compressed gas stream through a saline solution having a temperature of 20 to 80° C. to produce a first intermediate gas, and provide a first intermediate gas stream, a freshwater wash apparatus comprising a freshwater wash gas inlet and a freshwater wash gas outlet, the freshwater wash apparatus configured to receive the first intermediate gas stream, bubble the first intermediate gas stream through freshwater having a temperature of greater than −5° C. to less than 20° C. to produce a second intermediate gas, and provide a second intermediate gas stream, a cooling apparatus comprising a cooling gas inlet and cooling gas outlet, the cooling apparatus configured to cool the second intermediate gas to a temperature of −40 to −5° C. to produce a cooled gas, and a drying apparatus comprising a drying gas inlet, a chemical adsorbent, and a drying gas outlet, the drying apparatus configured to pass the cooled gas through the chemical adsorbent to produce a saturated adsorbent and the cooled dry gas, and provide a cooled dry gas stream.

In some embodiments, the saline wash apparatus and the freshwater wash apparatus each comprise a container comprising a swirling section, a wash liquid which is the aqueous saline or the freshwater contained within the container, a gas diffuser disposed at or within 10 cm below a surface of the wash liquid, the gas diffuser spanning at least 50% of a width of the container and being connected to the gas inlet, gas swirlers disposed in the swirling section, the swirlers comprising continuous angled or curved plates disposed throughout an entirety of a swirling section, and a demister.

In some embodiments, the gas diffuser is connected to the gas inlet via a flexible connection which permits the gas diffuser to remain disposed at or within 10 cm below a surface of the wash liquid as a volume of the wash liquid changes.

In some embodiments, the gas cooling system further includes a particulate remover located upstream of the compressor. The particulate remover is configured to remove particulates from the input gas stream.

In some embodiments, the gas cooling system further includes a recompression pathway connected to the freshwater wash apparatus and to the compressor which is configured to pass the second intermediate gas to the compressor such that the second intermediate gas is recompressed to form the compressed gas.

In some embodiments, the input gas is at least one selected from the group including the ambient atmosphere including nitrogen and oxygen, a hydrocarbon-including gas including a mixture of hydrocarbons including at least two selected from the group including methane, ethane, butane, propane, ethene, propene, 1-butene, 2-butene, and acetylene, and a fossil fuel waste gas including carbon dioxide.

In some embodiments, the input gas is the ambient atmosphere including nitrogen and oxygen and the second intermediate gas has a humidity of 3 to 5 g $H_2O$/kg input gas. In some embodiments, the cooling apparatus further includes a purified water outlet is configured to provide a purified water stream.

In some embodiments, the input gas is the ambient atmosphere including nitrogen and oxygen and the system produces 0.05 to 0.25 kg purified water per kg of ambient atmosphere cooled by the method.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
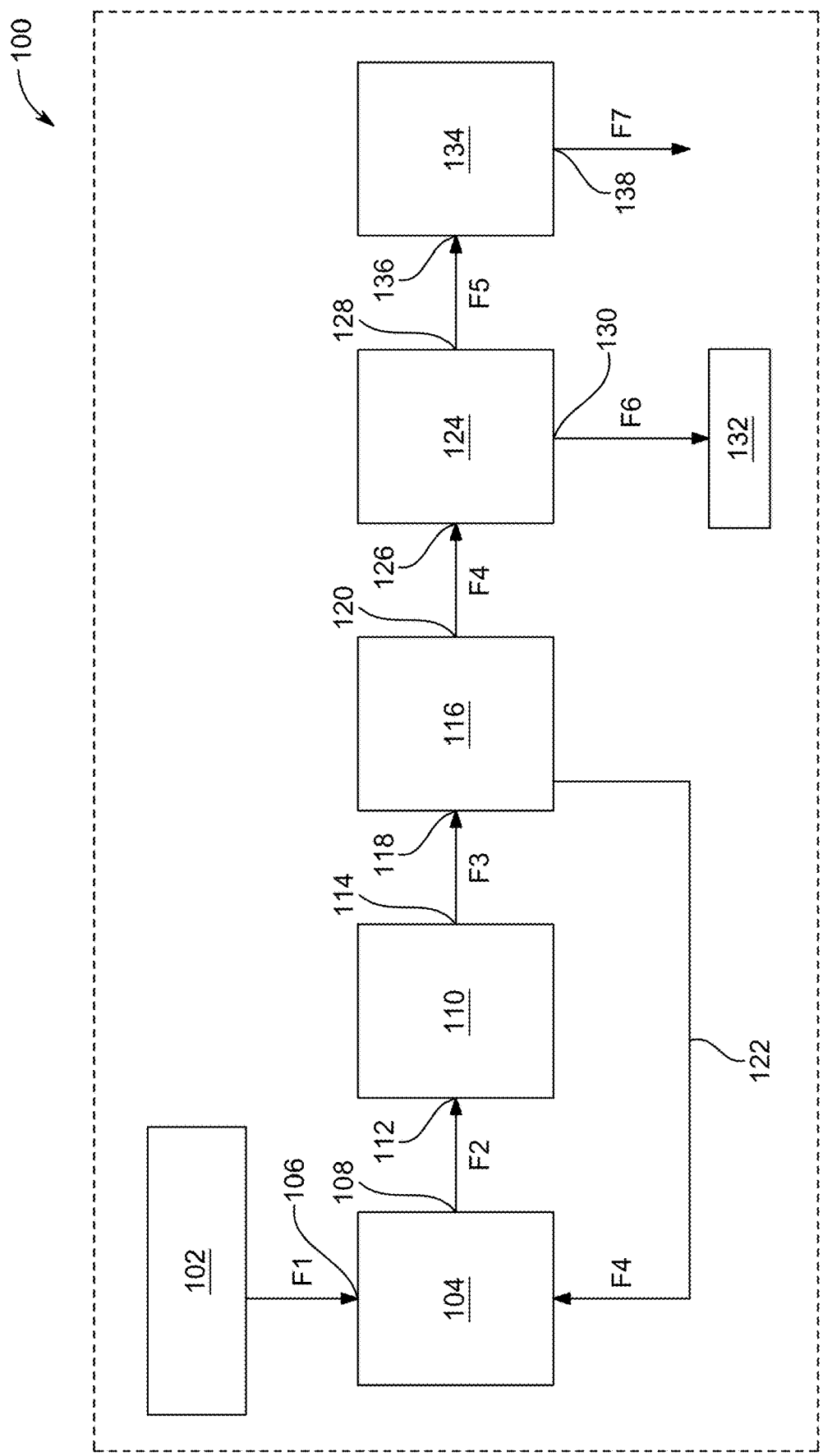
FIG. 1 is a schematic block diagram of a gas cooling system, according to an embodiment of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present invention are directed toward a gas cooling system, referred to herein as the 'system'. The system produces a cooled dry gas via a method described in the present disclosure. Although the description herein refers to cool drying of input gases such as nitrogen, oxygen, hydrocarbon-containing gases, and carbon dioxide, it may be understood by a person skilled in the art, that aspects of the present disclosure may be directed towards cooling of any suitable gases, examples of which include, but are not limited to carbon monoxide, helium, neon, argon, and ozone. In addition to the cooled dry gas, the system produces, as a by-product of the operation, purified water. The production of purified water is achieved through a co-generation desalination process intimately linked with the process of producing the cooled dry gas. This co-generation of the cooled dry gas and purified water may be advantageous for reducing industrial footprint compared to separate systems for each product, increasing energy or material efficiency, and decreasing environmental impact of the system. In addition, the process of direct contact of the gas and water gives superior direct heat exchange compared to indirect heat exchange cooling.

Referring to FIG. 1, a schematic block diagram of a gas cooling system 100 (also referred to as the system 100) is illustrated. The gas cooling system 100 includes an input gas stream 'F1'. The input gas stream may represent a flow or other introduction of an input gas. In some embodiments, the input gas, which may also be referred to as the 'feed air', is at least one selected from a group consisting of an ambient atmosphere (also referred to as atmospheric air, a hydrocarbon-comprising gas, and a fossil fuel waste gas comprising carbon dioxide. Ambient atmosphere comprises nitrogen and oxygen. Ambient atmosphere may further comprise any other suitable gases known to be present in Earth's atmosphere, examples of which include, but are not limited to argon, carbon dioxide, water vapor, hydrogen, krypton, neon, methane, helium, sulfur oxides such as sulfur dioxide and sulfur trioxide, nitrogen oxides such as nitrous oxide, nitrogen dioxide, and nitric oxide, carbon monoxide, ozone, ammonia, and dimethyl sulfide. In an embodiment, the input gas is in an ambient atmosphere, comprising nitrogen and oxygen. The hydrocarbon-comprising gas may comprise a mixture of hydrocarbons including at least two selected from a group consisting of methane, ethane, butane, propane, ethene, propene, 1-butene, 2-butene, and acetylene. Such hydrocarbons may be provided as a mixture obtained from sources such as a natural gas well or decomposition of a suitable organic material such as biomass, coal, kerogen, petroleum, and the like. The fossil fuel waste gas comprising carbon dioxide may be any suitable such fossil fuel waste gas known to one of ordinary skill in the art. Such a fossil fuel waste gas may be generated by the combustion of fossil fuels, for example coal or oil. Such combustion may be complete or incomplete. In general, thermochemical processing of gases, liquids or solids that result in significant gases as the main or secondary products in presence of any of oxygen concentration which is close or far from the stoichiometric ratio of the feed material can be processed using the described process. For example, gaseous products of combustion, pyrolysis, or gasification could be cooled, compressed, and/or liquified using the described process. The fossil fuel waste gas comprising carbon dioxide may further comprise other gases which the skilled artisan would recognize as being commonly associated with fossil fuel use, examples of which include, but are not limited to hydrocarbon gases, such as those listed above, sulfur oxides such as sulfur dioxide and sulfur trioxide, nitrogen oxides such as nitrous oxide, nitrogen dioxide, and nitric oxide, carbon monoxide, oxygen, hydrogen, water vapor, and the like.

In some embodiments, the gas cooling system 100 includes a particulate remover 102 located upstream of a saline wash apparatus 110, and optionally upstream of a compressor 104, of the system 100. The particulate remover 102 is configured to remove particulates from the input gas stream 'F1'. In some embodiments, the particulates may include, but are not limited to, dust, pollen, soot, smoke, salt particles, aerosol particles and liquid droplets such as water and sulfuric acid droplets. The particulate may be removed from the input gas by any suitable method known to one of ordinary skill in the art. Examples of such methods include, but are not limited to, a centrifugal action, for example, by swirling an air flow which may deposit high density particles away from a main gas flow, an electrostatic filter which charges and attracts suspended particles to walls, baffling an air flow to deposit particulates, and washing of an input gas in water to capture the suspended particles. The particulate remover 102 may be or comprise any suitable equipment for carrying out such methods mentioned above. In an embodiment, the particulate remover 102 may include a plurality of swirl tubes (not shown) to remove the particulates.

In some embodiments, the gas cooling system 100 includes a compressor 104 located upstream of the saline wash apparatus 110. The compressor may be any suitable type of compressor known to one of ordinary skill in the art. Examples of types of compressors include, but are not limited to rotary compressors, including lobe, screw, liquid ring, scroll, and vane compressors; reciprocating compressors including diaphragm, single acting, and double acting compressors; centrifugal compressors; and axial compressors. The compressor 104 includes a gas inlet 106 and a gas outlet 108. The compressor 104 is configured to receive the input gas stream 'F1' via the gas inlet 106 and provide a compressed gas stream 'F2' via the gas outlet 108. The compressor 104 increases the pressure by compressing the input gas to the compressed gas stream 'F2'. Such an increase in pressure is typically accompanied by an increase in temperature. This increase in temperature may cause the compressed gas stream 'F2' to have a higher temperature than the input gas stream 'F1'. The inclusion of the compressor may be particularly advantageous in applications or situations where the desired cooled dry gas be obtained or delivered at a pressure higher than the input gas stream 'F1'.

Figure 4:
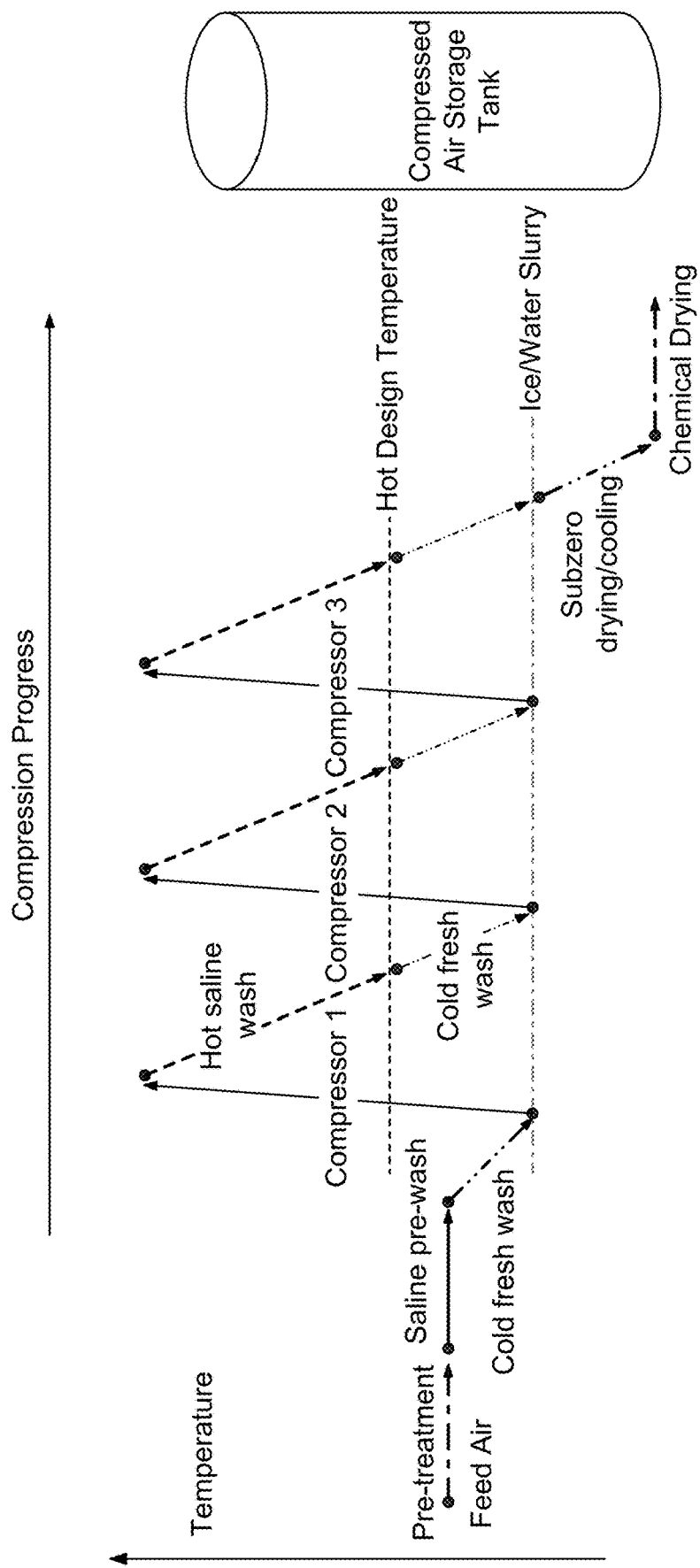
FIG. 4 is an exemplary implementation of the method of FIG. 3, according to an embodiment.

In some embodiments, other components of the system described herein are particularly useful for cooling the compressed gas stream 'F2' in order to counteract heating caused by compression of the input gas stream. In an embodiment, the system 100 includes more than one compressor (as shown in FIG. 4).

The gas cooling system 100 includes a saline wash apparatus 110 including a saline wash gas inlet 112 and a saline wash gas outlet 114. The saline wash apparatus 110 is configured to receive the input gas stream 'F1' and/or the compressed gas stream 'F2' via the saline wash gas inlet 112 (which is connected to the gas outlet 108). The saline wash apparatus 110 is configured to expose or otherwise contact the compressed gas stream 'F2' with a saline solution, otherwise referred to as the 'brine' or 'brine solution' or 'saline solution' or 'solution', having a temperature of 20 to 80° C., preferably 30 to 75° C., preferably 40 to 70° C., preferably 50 to 65° C., preferably 60° C. to produce a first intermediate gas 'F3'. The first intermediate gas 'F3' may have a temperature which is lower than the input gas stream 'F1' and/or the compressed gas stream 'F2'. Such a process may involve transfer of heat from the input gas stream 'F1' and/or the compressed gas stream 'F2' to the saline solution. The saline wash apparatus 110 may comprise any suitable temperature regulating equipment useful to maintaining the saline solution at the temperature described above. In general, the temperature regulating equipment may be any suitable temperature regulating equipment known to one of ordinary skill in the art. For example, a mechanical refrigeration system (not shown) of the gas cooling system 100 may heat or cool the saline wash apparatus 110 or the saline solution to the proper temperature described above. Such refrigeration may be advantageous for keeping the saline solution at a desired temperature or within a desired temperature range. The saline solution may require heat input to reach or maintain a desired temperature which is above that of, for example, ambient atmosphere but for which insufficient heat is supplied by the input gas stream 'F1' and/or the compressed gas stream 'F2'. Maintaining such an elevated temperature may be advantageous for increasing freshwater output. In some embodiments, the system 100 may include any other source or cold/hot phase changing material. The saline solution may further be useful for removing particulates from the compressed gas stream 'F2'. In some aspects, some gaseous or non-gaseous components of the compressed gas stream 'F2' may dissolve or interact with the saline solution.

In some embodiments, the saline wash apparatus comprises a container comprising a swirling section. In general, the container may be any suitable shape known to one of ordinary skill in the art. In some embodiments, the container may have a circular or ovoid cross-section. Such a cross-section may be particularly useful in embodiments where the input gas is supplied to the saline wash apparatus at a pressure which is substantially different (e.g. by 10% or more) than ambient atmospheric pressure. The rounded (circular or ovoid) cross-section may be useful in distributing forces causes by a pressure differential between the input gas and/or first intermediate gas and the ambient atmosphere outside of the container. The container contains the saline solution. The container may be constructed of any suitable material or combination of materials known to one of ordinary skill in the art. Examples of such suitable materials include, but are not limited to glasses such as soda lime glass and borosilicate glass, metals such as steel and aluminum, and plastic.

In some embodiments, the saline wash apparatus comprises a gas diffuser. The gas diffuser may be any suitable structure or equipment which is configured to introduce the input gas into the saline solution as a stream of bubbles. For example, the gas may be passed through a pipe or other channel into the saline solution. The pipe or channel may have a single opening or multiple openings through which the gas may pass. Multiple openings may be disposed over an entirety or a portion of the gas diffuser. Multiple openings may be arranged in a pattern so as to distribute the bubbles of gas within the saline solution. In some embodiments, the gas diffuser is or comprises a porous material disposed at one or more openings through which the gas may pass. The porous material may be useful for producing small bubbles and/or for distributing bubbles across a larger volume compared to an embodiment which does not contain the porous material. In general, the porous material may be any suitable porous material known to one of ordinary skill in the art useful for the above purposes. Examples of such porous material include porous glass plates or monoliths, porous metal oxides such as alumina, geological materials such as rocks or minerals (also known as air stones), fiberglass materials, and polymer materials. The porous material may have any suitable pore size. In some embodiments, the porous material is mesoporous, that is, having a mean pore size of 2 to 50 nm. In some embodiments, the porous material has a mean pore size of greater than 50 nm to 1,000 nm. In some embodiments, the porous material has a mean pore size of greater than 1,000 nm to 10,000 nm. In some embodiments, the porous material has a mean pore size of greater than 10,000 nm (10 μm) to 100 μm. In some embodiments, the porous material has a mean pore size of greater than 100 μm to 1000 μm (1 mm). In some embodiments, the gas diffuser is disposed at or within 10 cm, preferably within 9 cm, preferably within 8 cm, preferably within 7 cm, preferably within 6 cm, preferably within 5 cm below a surface of the saline solution. In some embodiments the gas diffuser floats in the saline solution. That is, the gas diffuser, while gas is flowing, has a density sufficient to rise to the surface or to within the distance below the surface described above. In some embodiments, the gas diffuser is connected to the gas inlet via a flexible connection. This flexible connection may allow the gas diffuser to change a distance to the gas inlet such that the gas diffuser remains at a location with respect to the surface of the saline solution as described above.

In some embodiments, the gas diffuser spans at least 50%, preferably at least 55%, preferably at least 60%, preferably at least 65%, preferably at least 70%, preferably at least 75% of a width of the container. It should be understood that in this context, the width of the container refers to a dimension which is substantially perpendicular to the direction of gravitational force acting on the container and the saline solution. It may be substantially parallel to an undisturbed surface of the saline solution. In embodiments where the container has a circular cross-section, the width may refer to a diameter of the container. In embodiments where the container has an anisotropic cross-section, the width refers to the longer of the dimensions of the cross-section (e.g. the major axis of an oval cross-section). The gas diffuser may span any suitable percentage of the length of the container (i.e. the other dimension which is not the height). In some embodiments, the gas diffuser is a single pipe or channel. In some embodiments, the gas diffuser comprises multiple pipes or channels. In some embodiments, the pipe(s) or channel(s) may be straight, curved, or form complex enclosed shapes such as circles, ellipses, or polygons. In some embodiments, the saline wash apparatus and/or the freshwater wash apparatus comprises one or more trays which have openings or holes, the trays holding the saline solution or freshwater. Such trays are typically referred to as "sieve trays". The interaction of the gas with the liquid present on the sieve trays results in cooling the hot gas and the saline water along with humidification of the hot input gas. In some embodiments, the sieve trays comprise multiple holes. In some embodiments, the holes have a mean hole size of 1 to 15 mm, preferably 2 to 12 mm, or 2 to 5 mm. Preferably a plurality of sieve trays are present with holes of lower trays biased towards holes of a higher tray such that portions of the sieve trays do not have overlapping sections with holes. For example, a first tray has holes biased towards a center of the tray and a second tray above the first tray has holes biased to an outer perimeter of the tray. In some embodiments, the gas passes through the holes in the sieve tray(s) and contacts the saline solution or freshwater in the sieve tray.

In some embodiments, the container comprises gas swirlers disposed in the swirling section. The gas swirlers may be any suitable shape and may be constructed of any suitable material for agitating, causing turbulence in, or otherwise promoting mixing of the gas as it flows from a surface of the saline solution to the gas outlet. In some embodiments, the swirlers comprise continuous angled or curved plates. Such plates may be curved or angled in a single direction or in multiple directions. The plates being cured or angled in multiple directions, may refer to certain plates being curved or angled in one direction and other plates being curved or angled in another direction or the plates themselves being curved or angled in one direction for a portion of the extent of the plate and in another direction for another portion of the extent of the plate. Preferably the plates spiral helically around the axis of the container, preferably making less than a full around the axis of the container. In some embodiments, the gas swirlers comprise a liquid return channel. The liquid return channel is a structure (e.g., a central channel or ridge) which is disposed on the swirlers to direct a flow of liquid downward from a top of the swirling section (i.e. that closer to the gas outlet) back toward the surface of the saline solution. The liquid return channels may be particularly useful for removing collected liquid deposited on the gas swirlers and/or for preventing droplets from being carried by the gas out of the gas outlet. Preferably the gas swirlers are disposed throughout an entirety of a swirling section.

In some embodiments, the saline wash apparatus comprises a demister. The demister may be disposed just before, at, or just after the gas outlet. The demister may be useful for removing droplets from the first intermediate gas.

Figure 2:
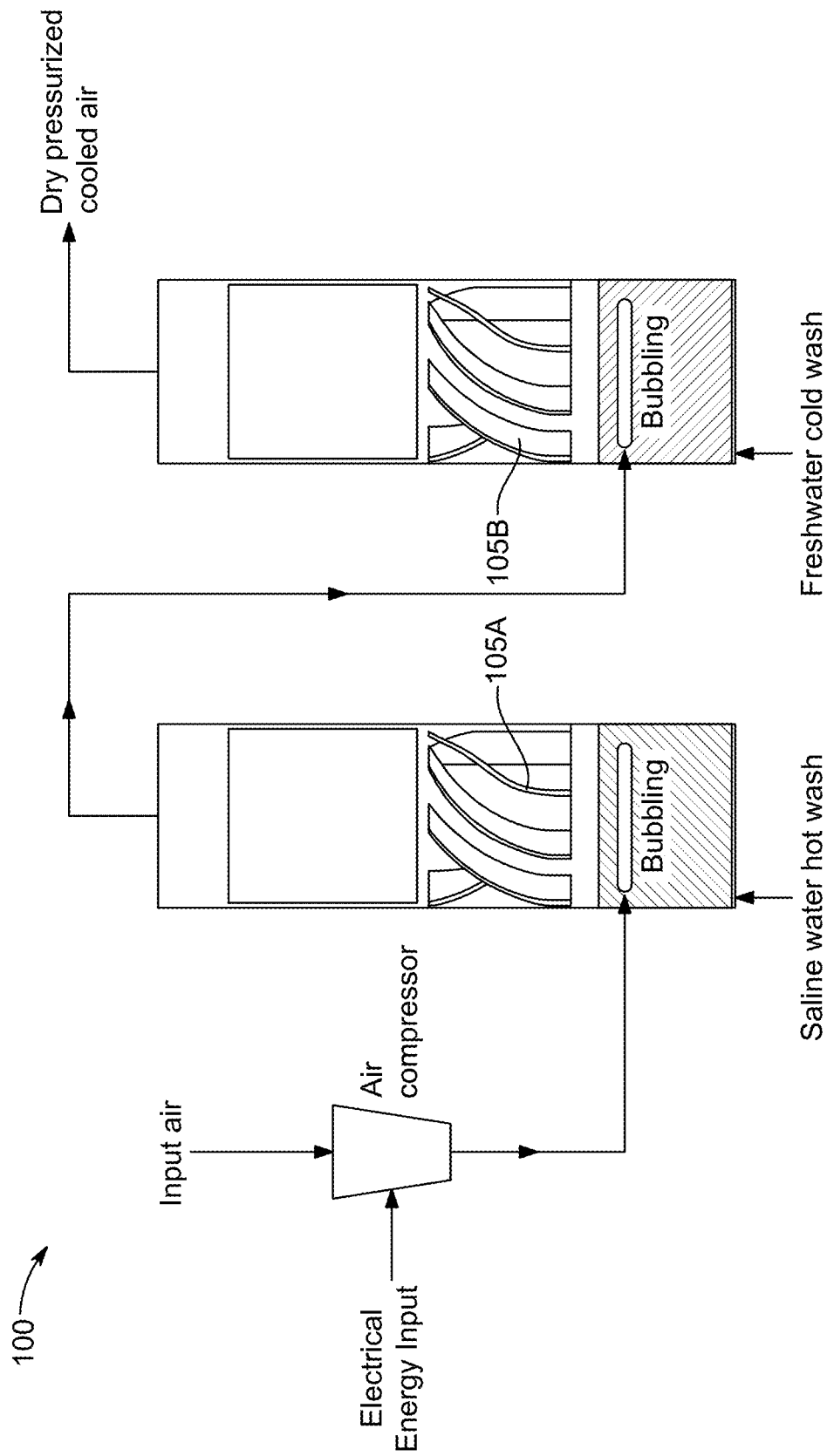
FIG. 2 is an exemplary illustration of the gas cooling system, according to an embodiment of the present disclosure.

An example of the saline wash apparatus 110 including the gas diffuser and a plurality of gas swirlers 105A is shown in FIG. 2.

On contact via the bubbling, the saline solution causes an initial cooling of the input gas and/or compressed gas towards the temperature of 20 to 80° C., preferably 30 to 75° C., preferably 40 to 70° C., preferably 50 to 65° C., preferably 60° C. Such cooling may involve energy flow, particularly in the form of heat, from the input gas and/or compressed gas to the saline solution. Such cooling may also involve mass transfer, for example, the generation of water vapor which results in an increased humidity of the first intermediate gas 'F3', compared to the input gas and/or compressed gas. The increase in the humidity/steam content of the first intermediate gas 'F3' may result in an increase in the salinity and a decrease in the water quantity of the saline wash apparatus 110. Such a change in the salinity or decrease in content of the saline solution may be undesirable for continuous use of the system. As such, the saline wash apparatus 110 may be configured to allow for or comprise suitable equipment for replenishing of the saline solution or components thereof (e.g. water). For example, an amount of saline solution may be added to the saline wash apparatus 110 to maintain the desired solution level, excessive salt in the saline wash apparatus 110 may be removed to maintain a desired salinity level, or freshwater may be added to both maintain the solution level and regulate the salinity level. The saline wash apparatus 110 is configured to provide the first intermediate gas 'F3' stream via the saline wash gas outlet 114.

The gas cooling system 100 includes a freshwater wash apparatus 116 including a freshwater wash gas inlet 118 and a freshwater wash gas outlet 120. The freshwater wash apparatus 116 is configured to receive the first intermediate gas 'F3' stream via the freshwater wash gas inlet 118. The freshwater wash apparatus 116 is further configured to expose or otherwise contact the first intermediate gas 'F3' stream with freshwater having a temperature of greater than −5° C. to less than 20° C., preferably −4 to 15° C., preferably −3 to 10° C., preferably −2 to 5° C., preferably −1 to 2.5° C., preferably 0° C. to produce a second intermediate gas 'F4'. In an embodiment, the freshwater wash apparatus 116 may include freshwater. In some embodiments, the freshwater wash apparatus 116 may include ice. In an embodiment, the freshwater wash apparatus 116 includes ice water slurry of temperature 0° C. The freshwater wash apparatus 116 may comprise any suitable temperature regulating equipment useful to maintaining a temperature of −5 to 20° C. as described above. In an embodiment, the mechanical refrigeration system of the gas cooling system 100 also operates the freshwater wash apparatus 116. The mechanical refrigeration system cools the ice water slurry present in the freshwater wash apparatus 116 and provides a partially frozen state to the ice water slurry. The partially frozen state of the ice water slurry is capable of cooling and condensing water vapors.

In some embodiments, the freshwater wash apparatus comprising a container comprising a swirling section as described above. In some embodiments, the freshwater wash apparatus comprises a gas diffuser as described above. In some embodiments, the freshwater wash apparatus comprises gas swirlers as described above. In some embodiments, the freshwater wash apparatus comprises a demister as described above.

Such mixing of the first intermediate gas 'F3' stream with freshwater leads to cooling of the first intermediate gas 'F3' stream. Such a cooling may be accompanied by a decrease in the humidity of the gas. That is, the second intermediate gas may have a lower humidity than the first intermediate gas, despite additional contact with water. In some embodiments, the second intermediate gas, has a humidity of 3 to 5 g $H_2O$/kg gas, preferably 3.25 to 4.75 g $H_2O$/kg gas, preferably 3.5 to 4.5 g $H_2O$/kg gas, preferably 3.75 to 4.25 g $H_2O$/kg gas, preferably 4 g $H_2O$/kg gas. In an example, the second intermediate gas 'F4' has a humidity of 4 g $H_2O$/kg gas at a temperature of 0° C. The freshwater wash apparatus 116 provides the second intermediate gas 'F4' stream via the freshwater wash gas outlet 120. The decrease in humidity may be accompanied by a condensation or other deposition of the water content of the first intermediate gas within the freshwater wash apparatus. Such condensation or other liquid water formed from the humidity of the first intermediate gas may increase an amount of freshwater present in the freshwater wash apparatus 116. The freshwater wash apparatus 116 may further comprise a freshwater liquid outlet. The freshwater liquid outlet may be useful for draining additional freshwater associated with the lowering of the humidity of the first intermediate gas.

In some embodiments, the gas cooling system 100 includes a recompression pathway 122 connected to the freshwater wash apparatus 116 and to the compressor 104, which is configured to pass the second intermediate gas 'F4' to the compressor 104 such that the second intermediate gas 'F4' is recompressed to form the compressed gas. In some embodiments, the compressor 104 may include a device that separates the second intermediate gas 'F4' from the input gas stream 'F1' to provide the compressed gas stream 'F2'. In some embodiments, the compressor 104 may mix the input gas stream 'F1' and the second intermediate gas 'F4' to form the compressed gas stream 'F2'. In some embodiments, the recompression pathway 122 may not allow the compressor 104 to receive the input gas stream 'F1' at the same time. The recompression pathway 122 may be particularly useful in embodiments where the multiple cycles of compression and cooling are desired.

The gas cooling system 100 includes a cooling apparatus 124 including a cooling gas inlet 126 and a cooling gas outlet 128. The gas cooling system 100 is configured to receive the second intermediate gas 'F4' stream via the cooling gas inlet 126 (which is connected to the freshwater wash gas outlet 120). The cooling apparatus 124 is configured to further reduce the temperature of the second intermediate gas, 'F4' by using an indirect heat exchanger. The cooling apparatus is configured to cool the second intermediate gas to a temperature of −40 to −5° C., preferably −35 to −10° C., preferably −30 to −15° C., preferably −25 to −17.5° C., preferably −20° C. to produce a cooled gas 'F5'. Such cooling may further reduce the humidity content of the second intermediate gas. The cooling gas outlet 128 of the system 100 provides the cooled gas 'F5'. The decrease in humidity may be accompanied by a condensation or other deposition of the water content of the second intermediate gas within the cooling apparatus. Such condensation or other liquid water formed from the humidity of the second intermediate gas may be collected within the cooling apparatus. A melting cycle can be done to warm/melt/remove solid ice from the cooling apparatus in form of liquid water. The cooling apparatus may be equipped with any suitable equipment, such as a heater, to accomplish this melting cycle. In some embodiments, the cooling apparatus 124 further includes a purified water outlet 130 is configured to provide a purified water stream 'F6'. In some embodiments, the system 100 produces 0.05 to 0.25 kg purified water per kg of the ambient atmosphere cooled by a method 300. The purified water may be collected in a container 132 of the system 100, shown for exemplary purposes. Such purified water may be derived from humidity present in the input gas before entering the system and/or humidity introduced to the gas from the contact with the saline solution and/or freshwater.

The gas cooling system 100 further includes a drying apparatus 134, including a drying gas inlet 136. The drying apparatus 134 is configured to receive the cooled gas 'F5' via the drying gas inlet 136 (which is coupled to the cooling gas outlet 128). The drying apparatus 134 further includes a chemical adsorbent. In some embodiments, the chemical adsorbent may include, but is not limited to, activated carbon, chitosan, zeolite, clay minerals, silica gel. The drying apparatus 134 is configured to expose the cooled gas 'F5' to the chemical adsorbent to produce a saturated adsorbent and a cooled dry gas. The drying apparatus 134 is configured to remove the remaining humidity content of the cooled gas 'F5'. In an embodiment, the cooled gas 'F5' may be exposed to the chemical adsorbent in Pressure Swing Adsorption (PSA). In an alternate embodiment, the cooled gas 'F5' may be exposed to the chemical adsorbent in Temperature Swing Adsorption (PSA) to reach the desired humidity point drying level. In some embodiments, only water content present in the cooled gas 'F5' is adsorbed by the chemical adsorbent. In some embodiments, after contacting the adsorbent, the cooled dry gas has a water content of less than 1,000 ppm, preferably less than 750 ppm, preferably less than 500 ppm, preferably less than 250 ppm, preferably less than 100 ppm, preferably less than 50 ppm, preferably less than 25 ppm, preferably less than 10 ppm, preferably less than 5 ppm, preferably less than 2.5 ppm, preferably less than 1 ppm, preferably less than 0.5 ppm, preferably less than 0.1 ppm, preferably less than 0.05 ppm, preferably less than 0.01 ppm by mass. In some embodiments, a number of components of the cooled gas 'F5' may also be adsorbed by the chemical adsorbent. The gas cooling system 100 provides a cooled dry gas stream 'F7' via a drying gas outlet 138. In some embodiments, the system 100 may be configured to include additional apparatuses to separate components such as hydrocarbons or carbon dioxide of the cooled dry gas (not shown here).

Figure 3:
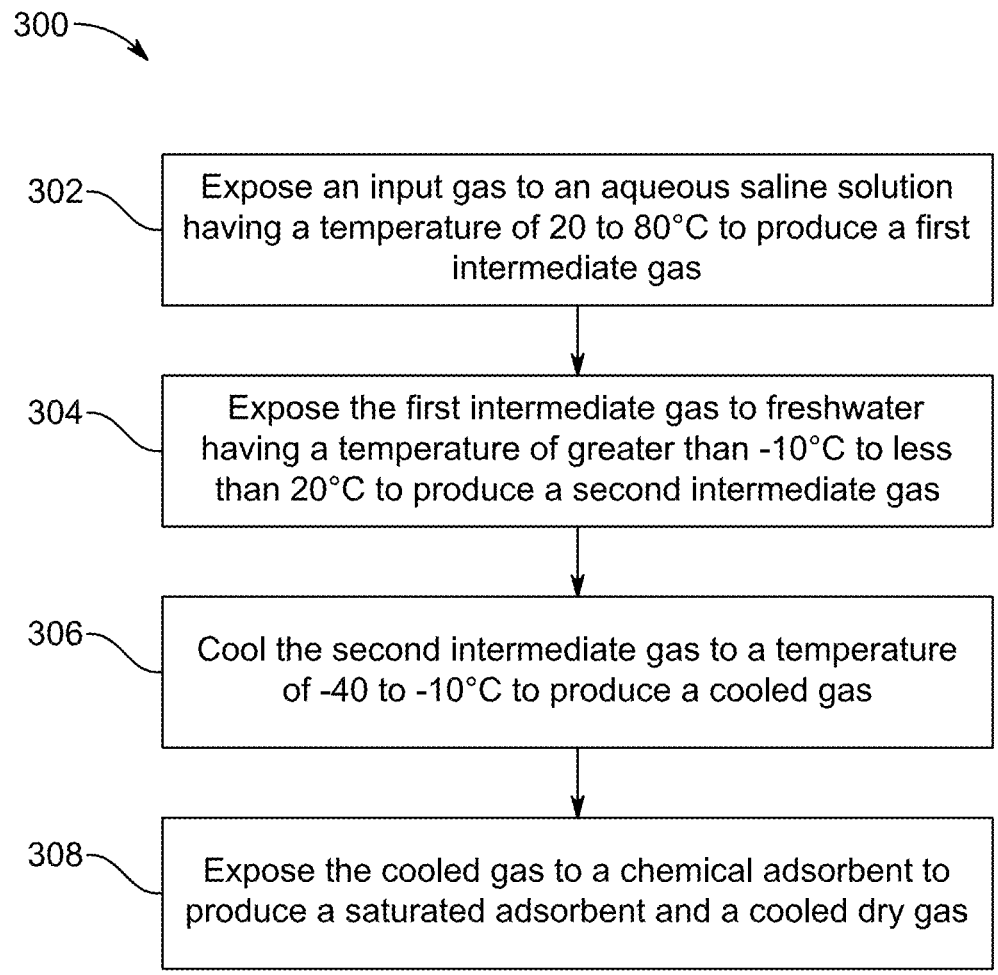
FIG. 3 is a flow chart of a method of producing a cooled dry gas, according to an embodiment.

Referring to FIG. 3, a schematic flow diagram of the method 300 of producing the cooled dry gas is illustrated. The method 300 is described with reference to the gas cooling system 100 and the exemplary illustration of the gas cooling system 100, illustrated in FIG. 1 and FIG. 2, respectively. The order in which the method 300 is described is not intended to be construed as a limitation, and any number of the described method steps can be combined in any order to implement the method 300. Additionally, individual steps may be removed or skipped from the method 300 without departing from the spirit and scope of the present disclosure. For example, steps 302 and 304 described below can be repeated in a method which involves more than one compression cycle.

At step 302, the method 300 includes bubbling the input gas through the aqueous saline solution, having a temperature of 20 to 80° C. to produce the first intermediate gas 'F3'. The bubbling the input gas through the aqueous saline solution may be performed as described above. For example, the input gas after compression is bubbled through the aqueous saline solution through a porous material under pressure, as shown in FIG. 2.

In an embodiment, the method 300 includes removing the particulates from the input gas before the bubbling step. In some embodiments, the method 300 may include removing particulates from any one of the first intermediate gas 'F3', the second intermediate gas 'F4', the cooled gas 'F5', the cooled dry gas. In an embodiment, the method 300 also includes removing the particulates and droplets from the first and second intermediate gases 'F3', 'F4' (for example, shown in FIG. 2). In yet another embodiment, the method 300 may include removing particulates at every step of the method 300. In some embodiments, the removing particulates is performed by one or more from a group including filtration, electrostatic precipitation, cyclonic separation, and wet scrubbing. In some embodiments, the removing particulates may also be performed by using gravitational, centrifugal, electrostatic and magnetic forces and thermal diffusion as described above.

In some embodiments, the input gas one or more selected from the group including the nitrogen and oxygen at ambient temperature, the hydrocarbon-including gas including the mixture of hydrocarbons including two or more selected from the group including methane, ethane, butane, propane, ethene, propene, 1-butene, 2-butene, and acetylene, and the fossil fuel waste gas including carbon dioxide. In some embodiments, the input gas is the ambient atmosphere including nitrogen and oxygen.

At step 304, the method 300 includes bubbling the first intermediate gas 'F3' through the freshwater having a temperature of greater than −5° C. to less than 20° C. to produce the second intermediate gas 'F4'. In some embodiments, the second intermediate gas, 'F4' has the humidity of 3 to 5 gram (g) $H_2O$/kilogram (kg) input gas. The bubbling the first intermediate gas 'F3' through the freshwater may be performed as described above and as shown in FIG. 2.

At step 306, the method 300 includes cooling the second intermediate gas, 'F4' to a temperature of −40 to −5° C. to produce the cooled gas 'F5'. In some embodiments, cooling the second intermediate gas 'F4' produces a first purified water which is separated from the cooled gas 'F5'. In some embodiments, the method 300 produces 0.05 to 0.25 kg purified water per kg of the ambient atmosphere cooled by the method 300. In some embodiments, the method 300 further includes compressing the second intermediate gas 'F4' to reform the input gas and repeating a cycle, otherwise referred to as the 'compression cycle', of the exposing of the input gas to the aqueous saline solution and the exposing of the first intermediate gas 'F3' (shown in FIG. 4). In some embodiments, the method 300 includes 2 to 100 such cycles before the cooling. In some embodiments, the method 300 may include more than 100 such cycles as per conditions depending on a customized gas cooling system. Three such cycles are illustrated in FIG. 4.

At step 308, the method 300 includes passing the cooled gas 'F5' through the chemical adsorbent to produce the saturated adsorbent and the cooled dry gas. In some embodiments, the method 300 includes subjecting the saturated adsorbent to a regeneration process to produce second purified water and reform the chemical adsorbent. In some embodiments, the regeneration process involves subjecting the saturated adsorbent to a reduced pressure and/or an elevated temperature.

The examples below are intended to further illustrate protocols for the construction and/or operation of the system and/or for performing the method and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Figure 5:
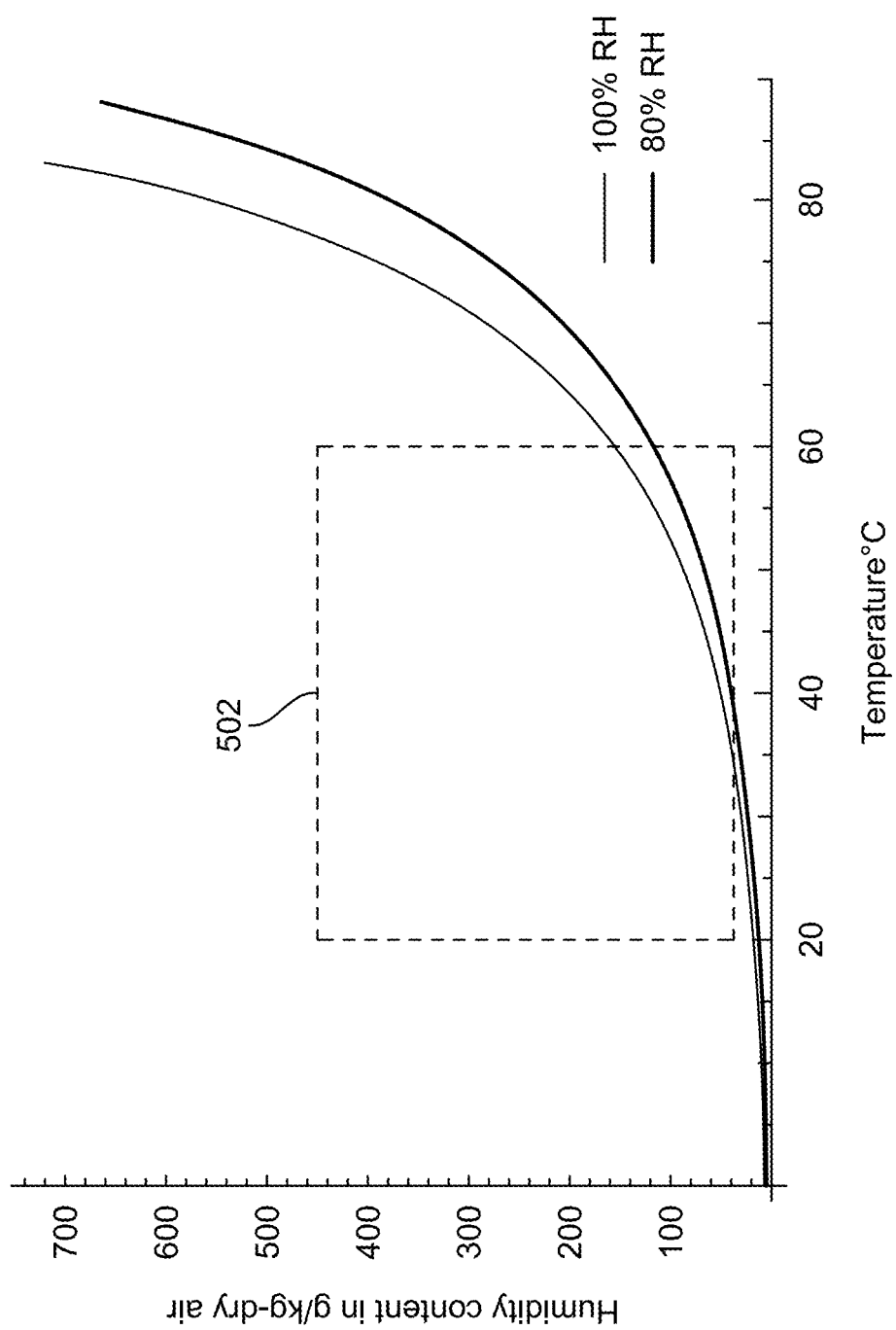
FIG. 5 is a graphical representation of absolute humidity of a first intermediate gas obtained after washing a compressed gas with a saline solution, according to certain embodiments.
Figure 6:
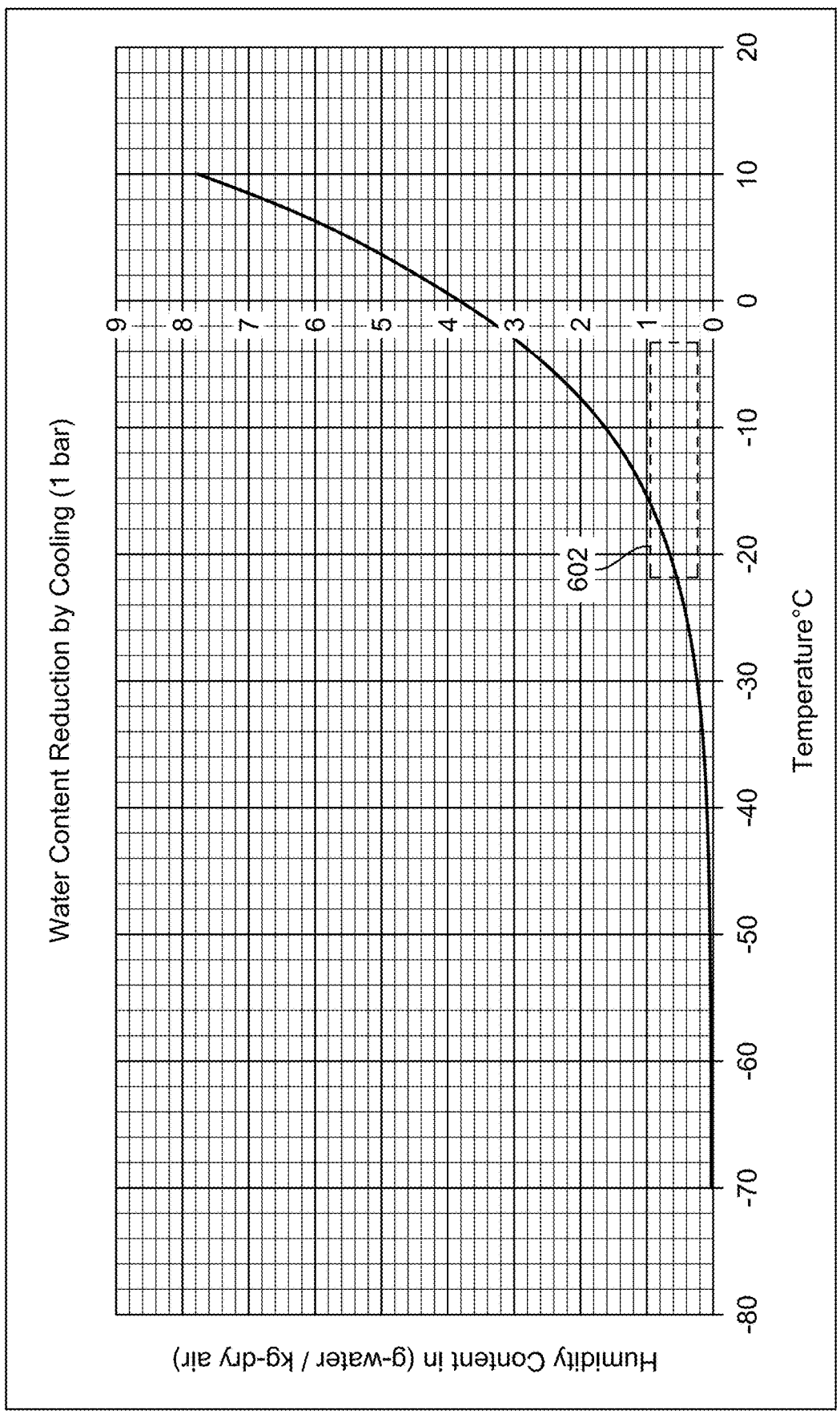
FIG. 6 is a graphical representation of a humidity content with respect to temperature, according to certain embodiments.

The water content (absolute humidity) of a gas is intimately related to the temperature of that gas. For example, FIG. 5, graphically displays the increase in the humidity/steam content by 10 folds or from 15 grams to 154 grams of water per kg of a dry air as the temperature increased from 20 to 60° C. Additionally, FIG. 6, shows a further decrease in the humidity to 0.6 g $H_2O$/kg input gas on cooling to −20° C.

A major consideration of the gas cooling involves the desired cooling level by the hot saline wash. For the purpose of the desalination effectiveness, it is desired to keep the relative humidity level high and keep the temperature of the humid air in the higher range of 20-80° C. as this maximizes the steam content of the processed gas especially in the first stage. This is illustrated in FIG. 5. In particular, increasing the temperate from 20° C. to 60° C. increases the steam content by 10 folds or from 15 grams to 154 grams of water per kg of dry air. However, such high temperatures increase the cooling load on the saline wash. Thus, more energy must be expended to maintain the saline solution at the correct temperature. Outside of the additional energy use of the system, however, the gas cooling and drying is minimally affected by the change in temperature of the saline wash, since the second cold wash by the ice water slurry always brings the final temperature down to 0° C. and absolute humidity to around 4 g-water/kg-dry-air. Cooling to −20° C. brings down the vapor content to 0.6 g/kg-air. As per ANSI/ISA-7.0.01 standard, the highest quality "Class 1" compressed air requires air with dew point of −70° C. corresponding to 1.6 μg/kg-air, see Table 1 below.

Figure 7:
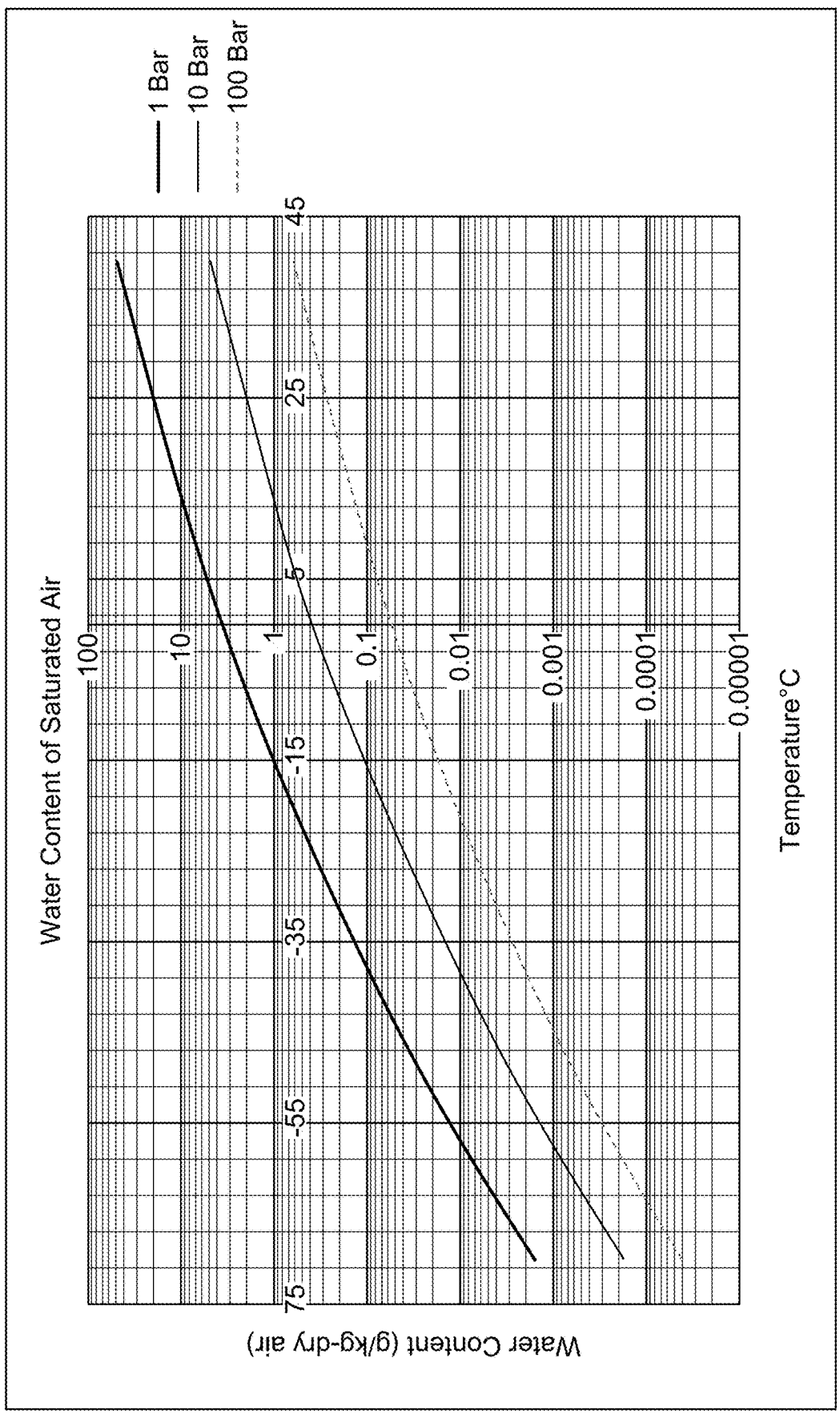
FIG. 7 is a graph representing an absolute humidity content of a gas as a function of pressure and temperature, according to certain embodiments.
Figure 8A:
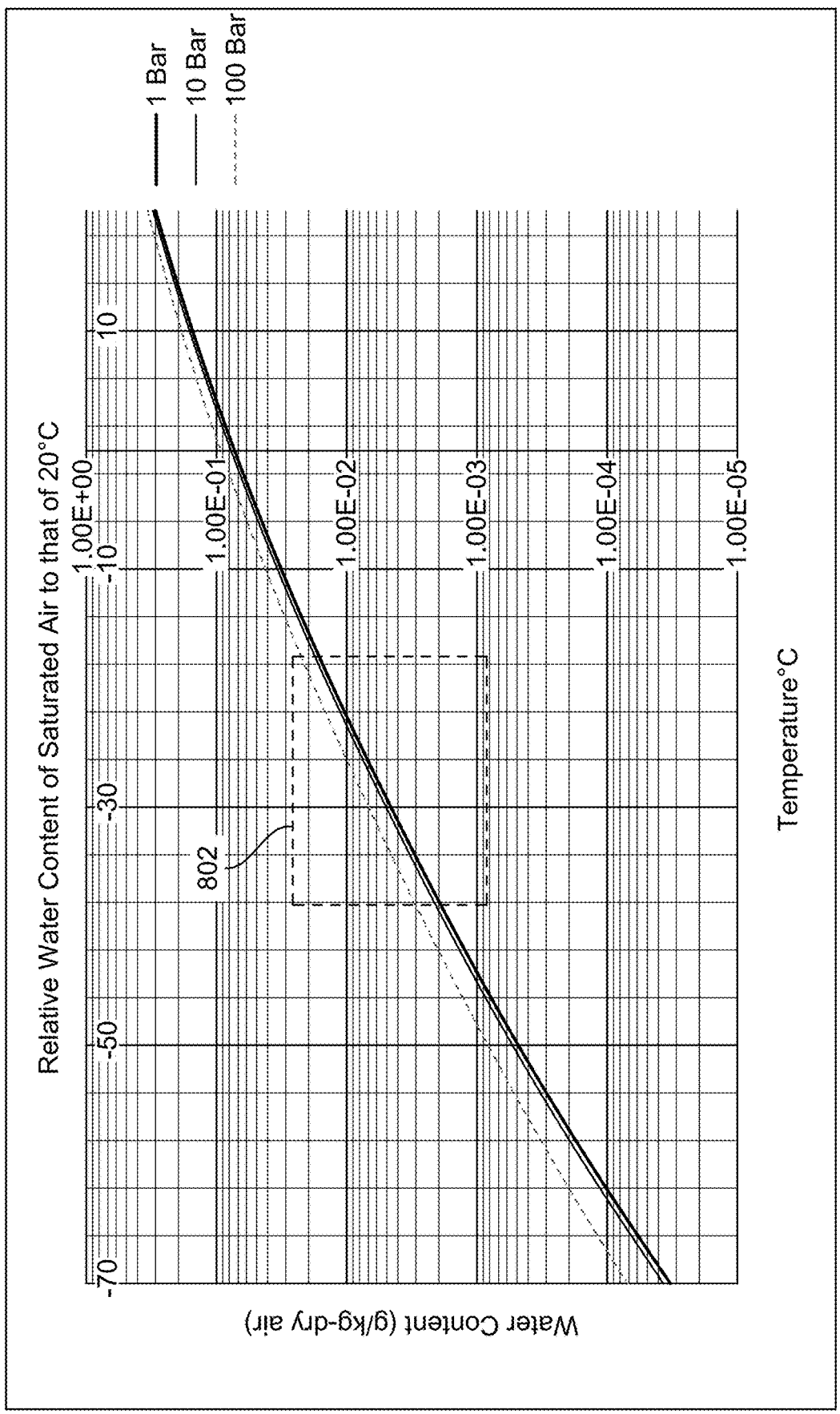
FIG. 8A is a graph representing a decrease in absolute humidity content of a saturated gas at 20° C. with cooling temperature, according to certain embodiments.
Figure 8B:
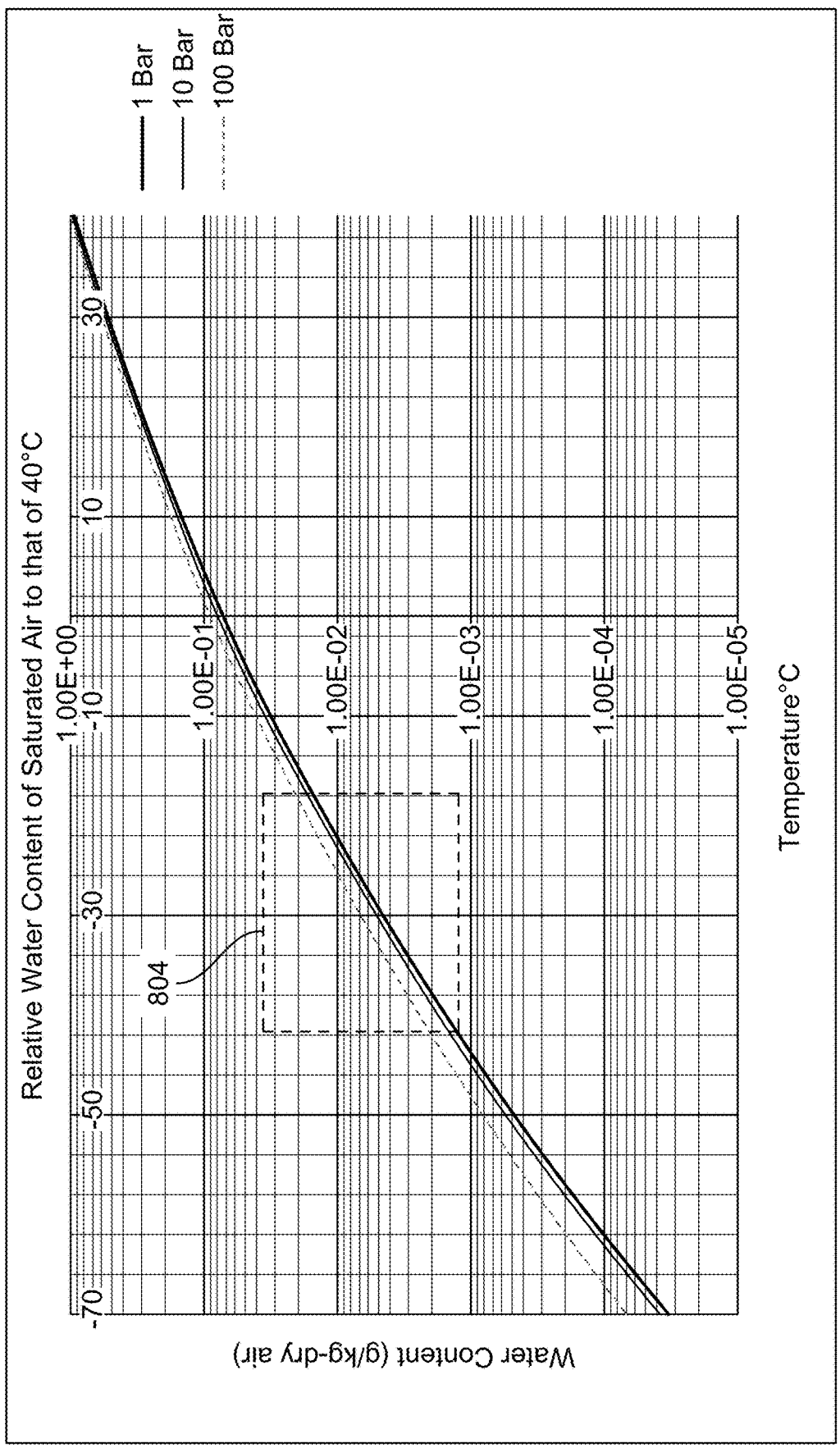
FIG. 8B is a graph representing a decrease in the absolute humidity content of the saturated gas at 40° C. with cooling temperature, according to certain embodiments.
Figure 9A:
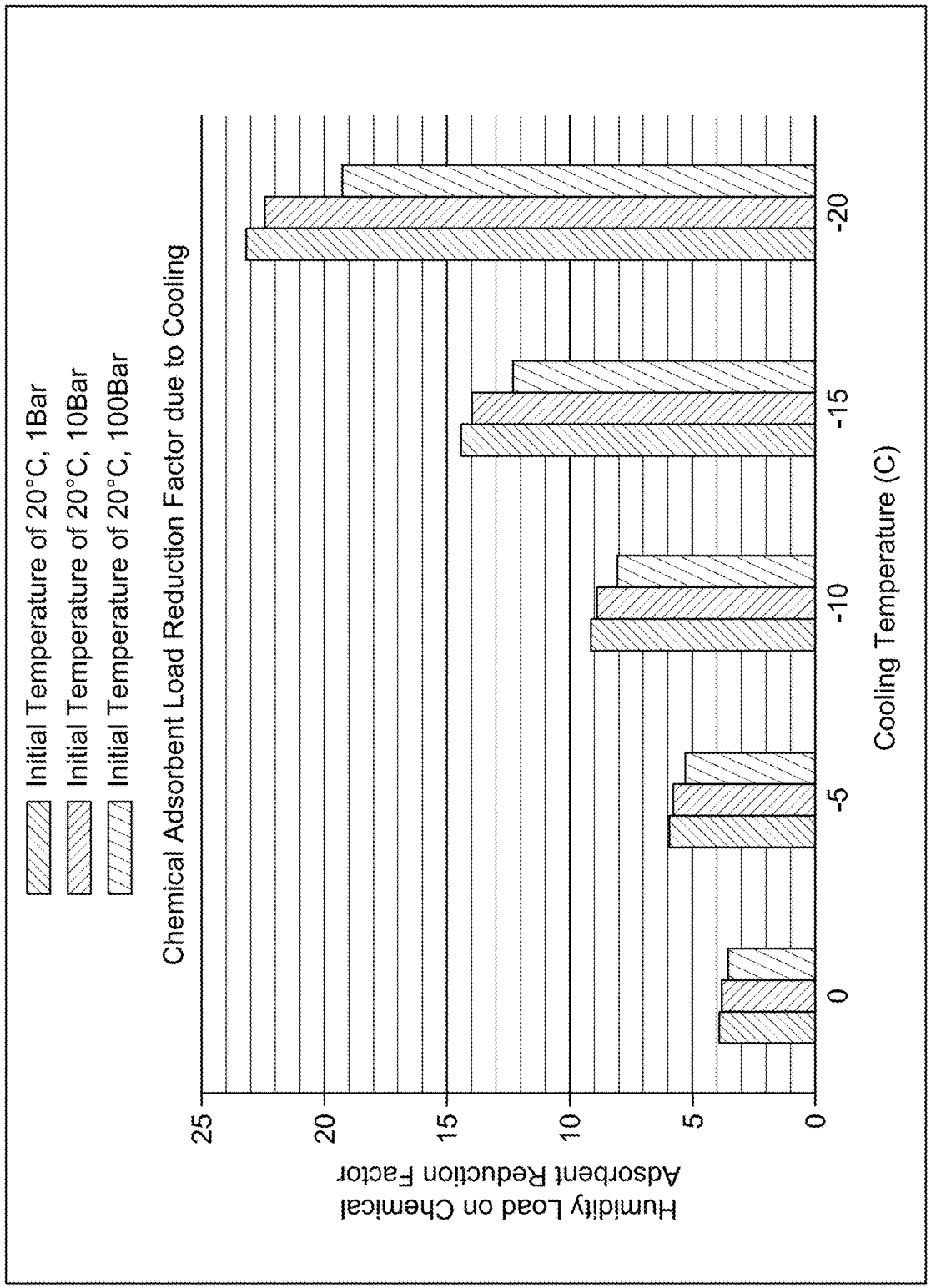
FIG. 9A is a graph representing a decrease in the humidity content of the saturated air at 20° C. for cooling to 0° C. to −20° C., according to certain embodiments.
Figure 9B:
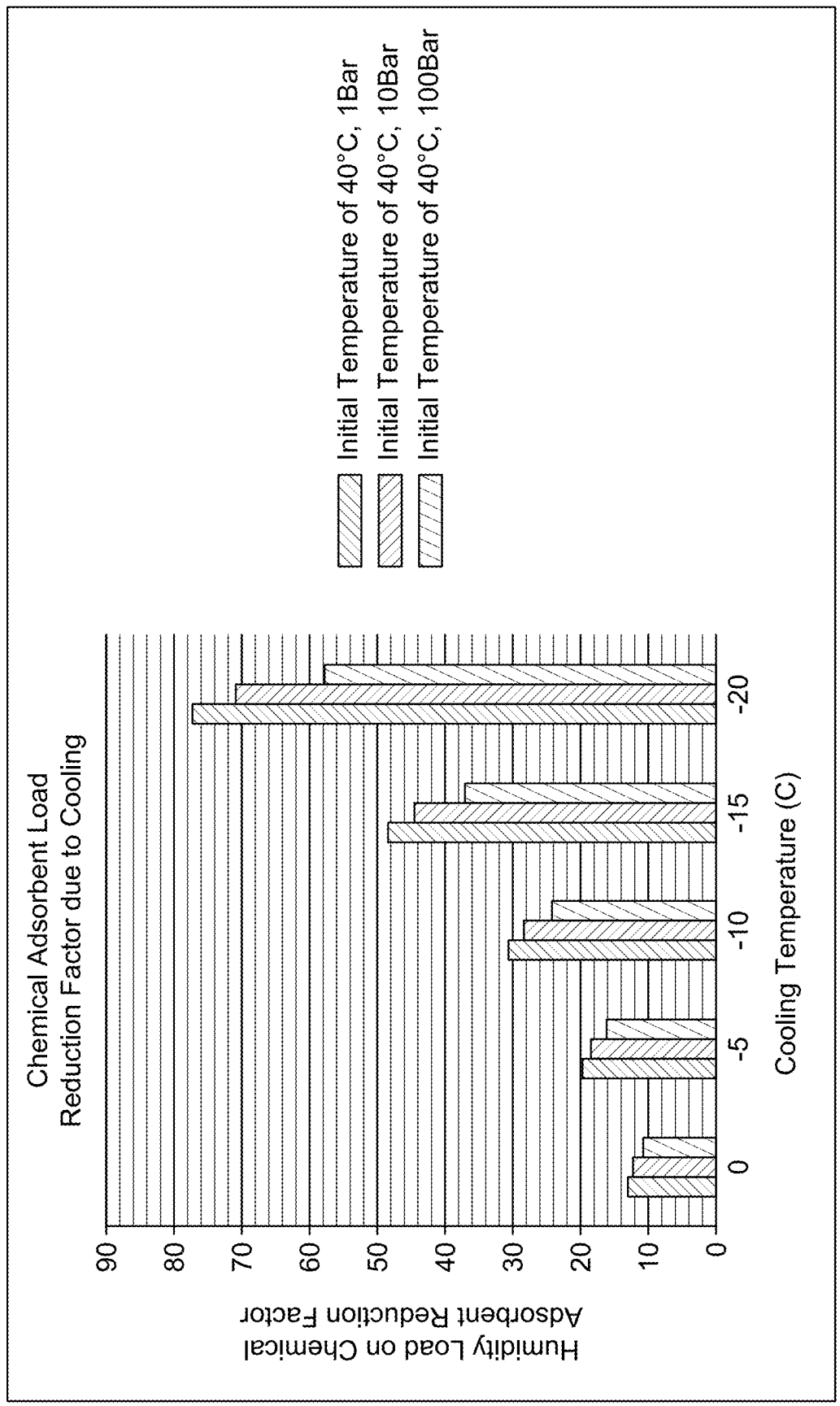
FIG. 9B is a graph representing a decrease in the humidity content of the saturated air at 40° C. for cooling to 0° C. to −20° C., according to certain embodiments.

The humidity content of a gas is also related to the pressure of the gas, as shown in FIG. 7. Further, boxes 802 and 804 of FIGS. 8A-8B show drop in the humidity content of saturated air at 20° C. and 40° C., respectively, on cooling at a wide range of pressures. The drop of the humidity content is significant and is in a range of 4×-20× for cooling to 0° C. to −20° C. for saturated air at 20° C. (as shown in FIG. 9A). A drop in the humidity content is in a range of 10×-70× for cooling to 0° C. to −20° C. for saturated air at 40° C. (as shown in FIG. 9B). The obtained air is passed over a chemical adsorption bed to significantly remove the remaining humidity content bringing a humidity level to a design value.

Figure 10:
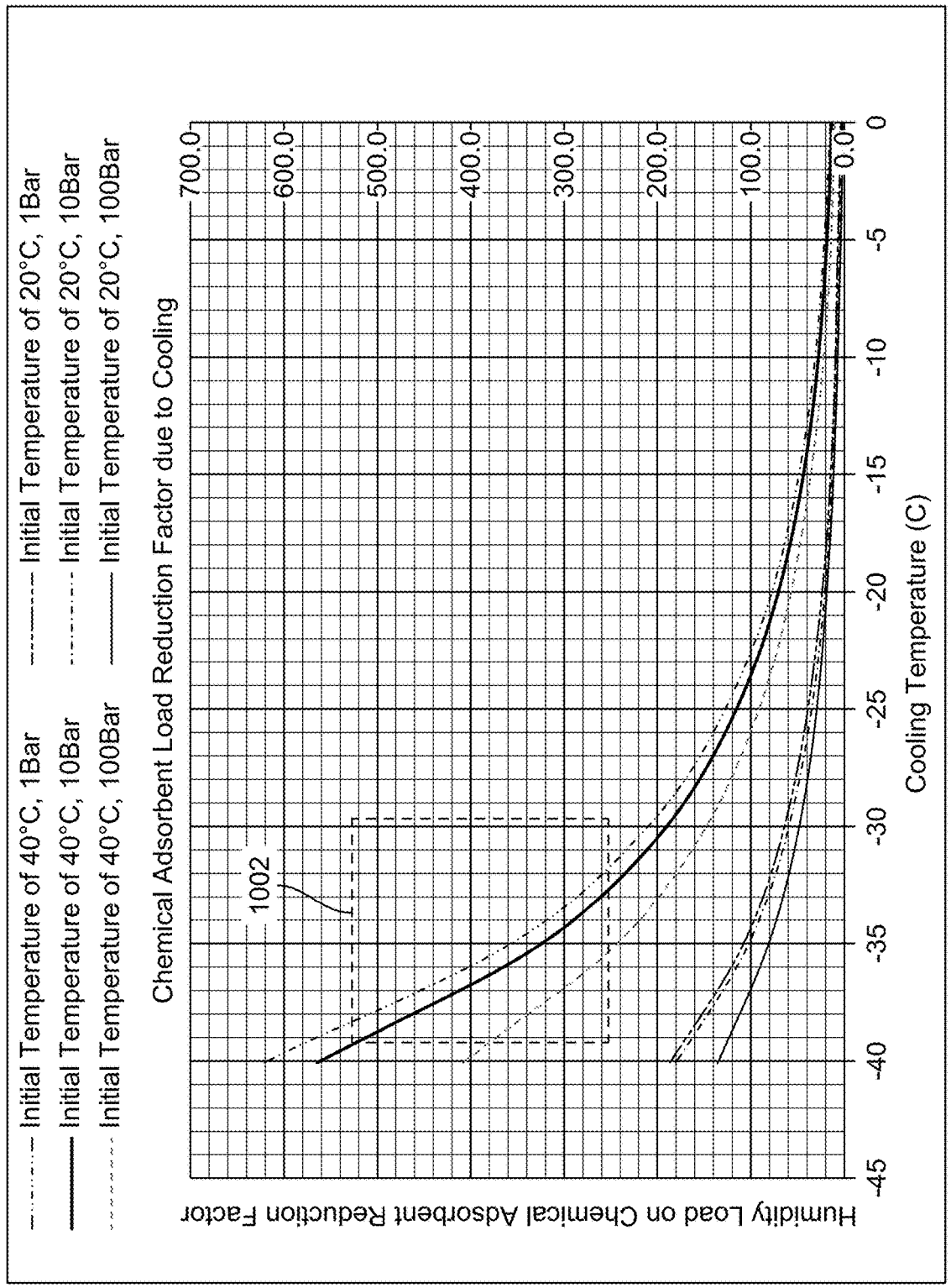
FIG. 10 is a graph representing a chemical adsorbent reduction factor as a function of pressure and temperature, according to certain embodiments.

Referring to FIG. 10, a graph representing a chemical adsorbent reduction factor as a function of pressure and temperature is illustrated. A box 1002 shows that water adsorption load on the chemical adsorbent is reduced (i.e. the amount of water the adsorbent must adsorb decreases) with a decrease in temperature and increase in pressure. Lower cooling temperatures may lead to lifetime extension and lower operational costs of a chemical adsorbent.

The resultant air is purified, dried, compressed and cooled. In some embodiments, the resultant air is stored as compressed air for an energy storage application. For example, Compressed Air Energy Storage (CAES) is a mechanical energy storage which utilizes air as an energy storage media. In another example, the resultant air may be liquified for air separation using a process, for example, Joule-Thompson process or an energy storage, for example, Liquid Air Energy Storage (LAES), a form of mechanical energy storage which includes liquified air.

Thermal energy is removed from gas streams after compression or other processing. Such thermal energy may be provided to a saline water so as to permit harvesting of freshwater. This may be advantageous for energy efficiency and for reducing requisite cooling load which is otherwise non-productive. The mechanical refrigeration system may reject extra thermal energy to external air by an air-cooled heat exchanger or through a cooling tower. In some embodiments, the mechanical refrigeration system may also reject extra thermal energy to thermal energy storages. In an embodiment, an isothermal compression process is examined. According to isothermal compression process, the heat rejected is the same as work stored. The work needed (assuming ideal gas) on taking 10 cubic meters of air and isothermally compressing the air into 100 bars, is given by equation (1).

$$E = p_B V_B \ln\frac{p_B}{p_A} = (100*10^5 \text{ Pa})(10 \text{ m}^3)\ln\frac{100}{1} = 4.6*10^8 J = 128 \text{ kWh,} \quad (1)$$

here, E is work or heat energy. $p_A$, $p_B$ are initial and final pressures, respectively, and V is volume. The work expended is the same as heat removed. Therefore, the present energy stored in the compressed air is taken and converted to water in a form of evaporated water, shown by equation (2).

$$m_w = \frac{E}{L_V} = \frac{128 \text{ kWh}}{678 \frac{\text{kWh}}{\text{m}^3}} = 189 \text{ liters} \quad (2)$$

here is $m_w$ is a mass of water, E is energy and $L_V$ is the latent heat of vaporization of water.

Two metrics provides water productivity as function of mechanical energy content of the compressed air. The water productivity is provided by equation (3).

$$\frac{m_w}{W} = \frac{189}{128} = 1.48 \frac{\text{liter}}{\text{kWh}} \quad (3)$$

Equation (3) is an approximate estimate as the compression process is not isothermal and requires more work for a greater generation of water. Further, not all the thermal energy is converted into water vapors since the system 100, and the method 100 generate and condense water vapors. In an embodiment, the lower limit of productivity, around one liter per kilowatt hour (kWh) of energy storage based on compressed air may be assumed.

However, evaporation of water may also be from highly saline sources as there is no limitation on a salinity ceiling imposed by the indirect heat exchange. In the present embodiment, a result of equation (3) is not compared to an actual spending of the thermal energy on a desalination system. In some embodiments, an evaporative desalination system may have 50 liters per kWh productivity (20 kWh/m$^3$).

In the present example, the water productivity is estimated in terms of the mass of the processed air. In an embodiment, the air is compressed to 300 bars in 10 m$^{\wedge}3$ volume at zero centigrade temperature. The mass of the air is calculated by using an ideal gas equation (4). The mass of the air is provided by equation (5).

$$pV = nRT \rightarrow n = \frac{pV}{RT} = \frac{(100*10^5 \text{ Pa})(10 \text{ m}^3)}{8.31*273 \text{ K}} = 4.40*10^4 \text{ mole,} \quad (4)$$

where p refers to the pressure of the air, V is the volume of the air, n is the number of moles of the air, R is the universal gas constant, and T is the temperature.

$$m_{air} = n*M = 4.40*10^4 \text{ mole} * \frac{29 \text{ g}}{\text{mole}} = 1.27*10^3 kg_{air} \quad (5)$$

In the present disclosure, the mass of the air is compared to the mass of water and shown by equation (6).

$$\frac{m_w}{m_{air}} = \frac{189 \text{ liter}}{1.37*10^3 kg_{air}} = 0.149 \frac{kg_{water}}{kg_{air}}$$

In an embodiment, freshwater mass equivalent to 15% of the processed air mass may be generated. For example, if facility process 350 tons of air per day, then around 52 m$^3$ of freshwater may be produced per day. In the application of cryogenic carbon capture, there is more water production coming from the thermal energy content of hot exhaust gases and steam content of a combustion process. Realistic modeling accounts for multi-stage compression, mechanical efficiency and intercooling processes. In an embodiment, a preliminary analysis may put the above mass ratio in a range of 0.10-0.30 depending on the number of stages and intercooling water temperatures.

In some embodiments, the step 302 of obtaining the first intermediate gas 'F3' by mixing the compressed gas stream 'F2' with the saline solution may correspond to evaporation of a water distillation process. In some embodiments, the step 304 of obtaining the second intermediate gas 'F4' obtained by mixing the first intermediate gas 'F3' with freshwater corresponds to condensation of the water distillation process. The step 306, cryogenic process brings down the humidity content of the cooled gas 'F5' to a desirable value. Further, as per American National Standards Institute/Instrumentation, Systems, and Automation Society (ANSI/ISA-7.0.01) standard, the highest quality 'Class 1' (table 1) requires air with a humidity point of $-70°$ C. corresponding to 1.6 µg/kg-air.

TABLE 1

| ANSI/ISA -7.0.01-1996 standard for an instrument air | | | |
|---|---|---|---|
| Quality Class | Particle Size (um) | Humidity point ° C. | Oil Content (mg/m3) |
| 1 | 0.1 | −70 | 0.01 |
| 2 | 1 | −40 | 0.1 |
| 3 | 5 | −20 | 1 |
| 4 | 15 | 3 | 5 |
| 5 | 40 | 7 | 25 |

The system 100 and the method 300 may be used for various applications which may include, but are not limited to, distillation air separation of gases such as oxygen, nitrogen and argon, cryogenic capturing of carbon dioxide from a waste gas stream coming from a combustion process, waste gasification, cement making or iron ore processing, cryogenic capturing of air, liquification of natural gas and other gases such as ammonia and hydrogen, stack gas cooling, compressed air is used in factories, CAES and LAES. CAES includes high power level, non-degrading property of the energy storage media (air), low storage cost, high energy storage density. Furthermore, LAES also includes high energy density.

Delivery of heat to the saline water through direct heat exchange with hot gases is one of the advantages of the present invention. The heat delivery to the saline water is direct and the heat exchange surface can never deteriorate. Exchange of heat and mass in direct contact of the gas with water enables dealing with high salinity water. Further, water includes high heat of vaporization. Bubbling of the input gas and the first intermediate gas 'F3' through the saline water and the freshwater, respectively, makes the heat exchange surface high. Scaling may not form in the present disclosure as the gas directly comes in contact with water.

Lowering the humidity content of the gas by sub-zero cooling before using the chemical adsorbent in PSA or TSA has reduced the load on the chemical adsorbent, which further extends lifetime of the chemical adsorbent and reduces operational cost, and provides the purified water. Further, use of the chemical adsorbent provides complete drying of the gas. The system 100 and the method 300 provide improved efficiency of the subsequent processes of distillation or liquification of gas streams.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of producing a cooled dry gas, the method comprising:
   bubbling an input gas through an aqueous saline solution having a temperature of 20 to 80 degree Celsius (° C.) to produce a first intermediate gas;
   bubbling the first intermediate gas through freshwater having a temperature of greater than −5° C. to less than 20° C. to produce a second intermediate gas;
   cooling the second intermediate gas to a temperature of −40 to −5° C. to produce a cooled gas; and
   passing the cooled gas through a chemical adsorbent to produce a saturated adsorbent and the cooled dry gas.

2. The method of claim 1, wherein the bubbling is achieved using a wash apparatus comprising:
   a container comprising a swirling section;
   a gas inlet;
   a wash liquid which is the aqueous saline or the freshwater contained within the container;
   a gas diffuser disposed at or within 10 cm below a surface of the wash liquid, the gas diffuser spanning at least 50% of a width of the container and being connected to the gas inlet;
   gas swirlers disposed in the swirling section, the swirlers comprising continuous angled or curved plates disposed throughout an entirety of a swirling section;
   a demister; and
   a gas outlet.

3. The method of claim 2, wherein the gas diffuser is connected to the gas inlet via a flexible connection which permits the gas diffuser to remain disposed at or within 10 cm below a surface of the wash liquid as a volume of the wash liquid changes.

4. The method of claim 1, wherein the cooling the second intermediate gas produces a first purified water which is separated from the cooled gas.

5. The method of claim 1, further comprising, before bubbling the input gas through the aqueous saline solution, removing particulates from the input gas.

6. The method of claim 5, wherein the removing particulates is performed by at least one selected from a group consisting of filtration, electrostatic precipitation, cyclonic separation, and wet scrubbing.

7. The method of claim 1, further comprising subjecting the saturated adsorbent to a regeneration process to produce a second purified water and reform the chemical adsorbent.

8. The method of claim 1, wherein the method further comprises
   compressing the second intermediate gas to reform the input gas, and repeating a cycle of the bubbling of the input gas to the aqueous saline solution and the bubbling of the first intermediate gas,
   wherein the method comprises 2 to 100 such cycles before the cooling.

9. The method of claim 1, wherein the input gas is at least one selected from a group consisting of:
   an ambient atmosphere comprising nitrogen and oxygen;
   a hydrocarbon-comprising gas comprising a mixture of hydrocarbons comprising at least two selected from a group consisting of methane, ethane, butane, propane, ethene, propene, 1-butene, 2-butene, and acetylene; and
   a fossil fuel waste gas comprising carbon dioxide.

10. The method of claim 9, wherein the input gas is an ambient atmosphere comprising nitrogen and oxygen and the second intermediate gas has a humidity of 3 to 5 gram (g) $H_2O$/kilogram (kg) input gas.

11. The method of claim 9, wherein the input gas is an ambient atmosphere comprising nitrogen and oxygen and the method produces 0.05 to 0.25 kg purified water per kg of ambient atmosphere cooled by the method.

12. A gas cooling system, comprising:
   an input gas stream;
   a compressor comprising a gas inlet and a gas outlet, the compressor configured to receive the input gas stream and provide a compressed gas stream;
   a saline wash apparatus comprising a saline wash gas inlet and a saline wash gas outlet, the saline wash apparatus configured to receive the compressed gas stream, bubble the compressed gas stream through a saline solution having a temperature of 20 to 80° C. to produce a first intermediate gas, and provide a first intermediate gas stream;
   a freshwater wash apparatus comprising a freshwater wash gas inlet and a freshwater wash gas outlet, the freshwater wash apparatus configured to receive the first intermediate gas stream, bubble the first intermediate gas stream through freshwater having a temperature of greater than −5° C. to less than 20° C. to produce a second intermediate gas, and provide a second intermediate gas stream;
   a cooling apparatus comprising a cooling gas inlet and cooling gas outlet, the cooling apparatus configured to cool the second intermediate gas to a temperature of −40 to −5° C. to produce a cooled gas; and
   a drying apparatus comprising a drying gas inlet, a chemical adsorbent, and a drying gas outlet, the drying apparatus configured to pass the cooled gas through the chemical adsorbent to produce a saturated adsorbent and the cooled dry gas, and provide a cooled dry gas stream.

13. The gas cooling system of claim 12, wherein the saline wash apparatus and the freshwater wash apparatus each comprise:
   a container comprising a swirling section;
   a wash liquid which is the aqueous saline or the freshwater contained within the container;
   a gas diffuser disposed at or within 10 cm below a surface of the wash liquid, the gas diffuser spanning at least 50% of a width of the container and being connected to the gas inlet;
   gas swirlers disposed in the swirling section, the swirlers comprising continuous angled or curved plates disposed throughout an entirety of a swirling section; and
   a demister.

14. The gas cooling system of claim 13, wherein the gas diffuser is connected to the gas inlet via a flexible connection which permits the gas diffuser to remain disposed at or within 10 cm below a surface of the wash liquid as a volume of the wash liquid changes.

15. The gas cooling system of claim 12, further comprising a particulate remover located upstream of the compressor, the particulate remover configured to remove particulates from the input gas stream.

16. The gas cooling system of claim 12, further comprising a recompression pathway connected to the freshwater wash apparatus and to the compressor which is configured to pass the second intermediate gas to the compressor such that the second intermediate gas is recompressed to form the compressed gas.

17. The gas cooling system of claim 12, wherein the input gas is at least one selected from a group consisting of:
- an ambient atmosphere comprising nitrogen and oxygen;
- a hydrocarbon-comprising gas comprising a mixture of hydrocarbons comprising at least two selected from a group consisting of methane, ethane, butane, propane, ethene, propene, 1-butene, 2-butene, and acetylene; and
- a fossil fuel waste gas comprising carbon dioxide.

18. The gas cooling system of claim 17, wherein the input gas is an ambient atmosphere comprising nitrogen and oxygen and the second intermediate gas has a humidity of 3 to 5 g $H_2O$/kg input gas.

19. The gas cooling system of claim 12, wherein the cooling apparatus further comprises a purified water outlet configured to provide a purified water stream.

20. The gas cooling system of claim 17, wherein the input gas is an ambient atmosphere comprising nitrogen and oxygen and the system produces 0.05 to 0.25 kg purified water per kg of ambient atmosphere cooled by the method.

* * * * *